May 10, 1927. 1,627,659
G. MAY
STOP SIGNAL FOR AUTOMOBILES
Filed Nov. 15, 1924
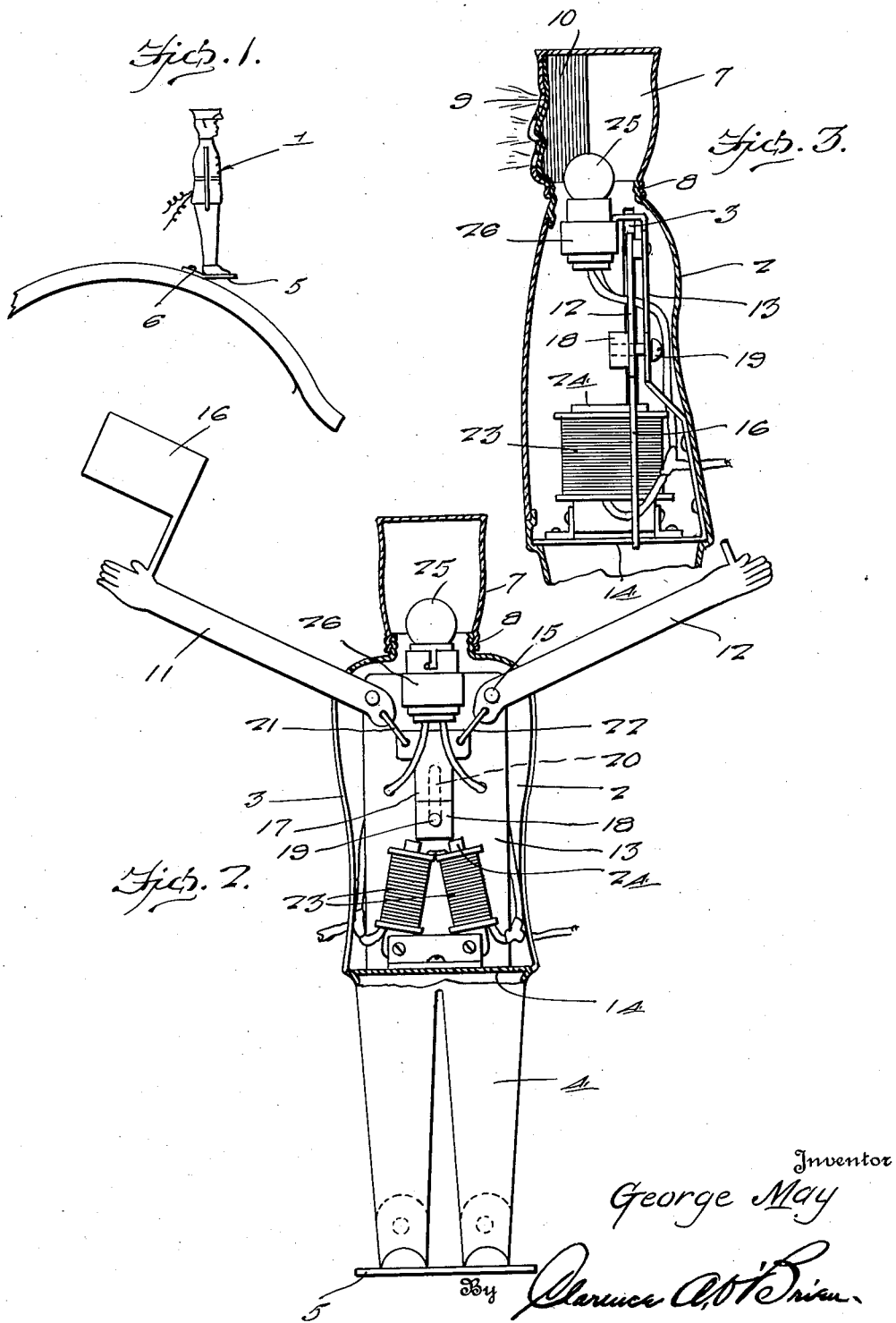
Inventor
George May
By Clarence A. O'Brien
Attorney Patented May 10, 1927.

1,627,659

UNITED STATES PATENT OFFICE.

GEORGE MAY, OF OIL CITY, LOUISIANA.

STOP SIGNAL FOR AUTOMOBILES.

Application filed November 15, 1924. Serial No. 750,101.

This invention relates to improvements in stop signals for automobiles and has for its principal object to provide a simple and efficient device which is adapted to be mounted on one of the fenders of an automobile in such a manner as to enable the operator of the automobile to indicate to pursuing vehicles that the automobile is about to stop or make a turn, thereby preventing the possibility of an accident.

One of the important objects of the present invention is to provide a stop signal of the above mentioned character, which is of such construction as to simulate a human figure, preferably a policeman, the arms of the figure being adapted to be swung outwardly when the signal is operated so that pursuing vehicles may readily ascertain the intentions of the operator of the automobile upon which the signal is mounted.

A further object of the invention is to provide a stop signal of the above mentioned character, wherein the head of the figure is provided with openings at predetermined positions, the same being covered by a transparent colored member, an electric lamp being associated with the head for illuminating the same and permitting the signal to be easily distinguished at night.

A further object of the invention is to provide a stop signal of the above mentioned character, which is simple in construction, inexpensive, strong and durable and furthermore adapted for the purposes for which it is designated.

Other objects and advantages of this invention will become apparent during the course of the following description.

In the accompanying drawing forming a part of this specification and in which like numerals designate like parts throughout the same:

Figure 1 is a side elevation of the stop signal embodying my invention showing the manner in which the same is mounted on one of the fenders of an automobile.

Figure 2 is a front elevation with a portion of the casing broken away, illustrating the manner in which the arms are associated with the sliding armature, the arms being shown in an extended position, and Figure 3 is a side elevation with the casing shown in section.

In the drawing wherein for the purpose of illustration is shown the preferred embodiment of my invention, the numeral 1 designates a casing which is preferably of such construction as to simulate a human figure. The figure in the present instance represents a policeman, although it is to be understood that the figure may represent any other human being. The body of the figure is represented at 2 and the sides thereof are slit longitudinally as illustrated at 3. The legs of the figure are illustrated at 4 and an attaching bracket 5 is associated with the same for securing the signal on one of the fenders of the automobile in the manner as illustrated at 6 with reference more particularly to Figure 1. The head 7 of the figure is threaded on the neck portion as illustrated at 8.

The head 7 is provided with openings 9 which are preferably arranged at the eyes, nose and mouth, and a transparent colored member 10 is arranged within the head 7 and covers the opening in the manner more clearly illustrated in Figure 3. The purpose of this construction will hereinafter be more fully described.

The arms of the figure are illustrated at 11 and 12 respectively, and are adapted for swinging movement through the longitudinally extending slots 3 provided in the opposite sides of the body of the figure. The inner ends of the arms are pivotally supported on the upper portion of the plate 13 which is secured within the body 2 of the figure, the plate 13 terminating at its lower end in the base portion 14 in the manner clearly illustrated in Figure 3. The pivotal securing means for the inner ends of the arms is illustrated at 15. The arms have formed on the outer ends thereof the flags 16.

A substantially T-shaped member in the form of a plate is illustrated at 17 and the same carries on the lower end of the leg portion thereof the armature 18. The securing means for the armature is shown at 19 and the same operates in a suitable longitudinal slot 20 formed in the plate 13. This construction permits the sliding movement of the T-shaped member 17 and the armature 18 carried thereby on the plate 13. The inner ends of the arms 11 and 12 are connected to the adjacent arms of the T-shaped members 17 by means of the links 21 and 22 respectively. The provision of a connection of this character enables the arms to be actuated simultaneously with the T-shaped member 17 and the armature 18 carried thereby.

The actuating means for moving the T-shaped member 17 downwardly on the plate 13 includes a pair of magnets 23 the cores thereof being illustrated at 24. The wiring associated with the magnets is connected up with a suitable source of supply and any suitable means may be provided for energizing the magnets, said means being such as is commonly associated with stop lights now generally in use and controlled by the actuation of the clutch or brake pedal of an automobile. The magnetic means is supported on the base portion 14 of the plate 13 as clearly illustrated in Figures 2 and 3 of the drawing.

An electric lamp 25 is disposed within the head 7 of the figure 1 and is supported in a suitable bracket 26 provided therefor on the upper portion of the plate 13. The wiring for the lamp 25 is connected with the wiring associated with the magnet 23 so that the lamp 25 will be illuminated simultaneously with the energizing of the magnets.

Normally the arms 11 are disposed in a vertical position at the sides of the body of the figure as illustrated in Figure 1. When the operator of the automobile desires to stop or make a turn, upon depressing the brake or clutch either of which the switch mechanism for energizing the magnets is associated, the magnets will be energized and the cores will attract the armature 18 causing the T-shaped members 17 to move downwardly on the plate 13 and simultaneously causing an outward and upward swinging movement of the arms 11 and 12 to the position shown in Figure 2. Simultaneously with outward and upward swinging movement of the arms 11 and 12, the lamp 25 will be illuminated causing the rays of light to pass through the openings 9, provided in the head 7 of the figure, which are covered with a transparent colored material thereby enabling pursuing vehicles to readily see the signal. As soon as the magnets are deenergized, by releasing the clutch or brake of the automobile, the weight of the arms will cause the same to return to their normal inoperative positions and the lamp 25 will become extinguished.

The simplicity in which my device is constructed enables the same to be easily and readily attached in position on one of the fenders of an automobile and will not necessitate the operation of any hand controlled switch means in order to operate the signal.

While I have shown the preferred embodiment of my invention, it is to be understood that various changes in the size, shape and arrangement of parts may be resorted to without departing from the spirit of the invention and the scope of the appended claim.

Having thus described the invention, what I claim is:—

A stop signal comprising a vertical supporting bracket, the lower end portion thereof being disposed laterally, a pair of laterally swinging arms, the inner ends of said arms being pivotally secured to the upper portion of the bracket and being normally disposed vertically, the intermediate portion of the bracket being provided with the longitudinally extending slot, a substantially T-shaped plate, a laterally projecting pin carried by the leg portion of said T-shaped member and operable in said longitudinally extending slot whereby the T-shaped plate is adapted for vertical sliding movement on the bracket, links connecting the inner ends of the laterally swinging arms to the adjacent arms of the T-shaped plate, an armature carried by the leg portion of the T-shaped plate, and magnetic means supported on the laterally disposed portion of said bracket and adapted for cooperation with the armature whereby the laterally swinging arms may be moved outwardly to an operative position when the armature is attracted by said magnetic means, said laterally swinging arms being adapted to be returned to their normal positions when the magnetic means is deenergized.

In testimony whereof I affix my signature.

GEORGE MAY.